H. A. GARDNER.
CEMENT STRUCTURE.
APPLICATION FILED JAN. 26, 1915.
1,230,475.
Patented June 19, 1917.
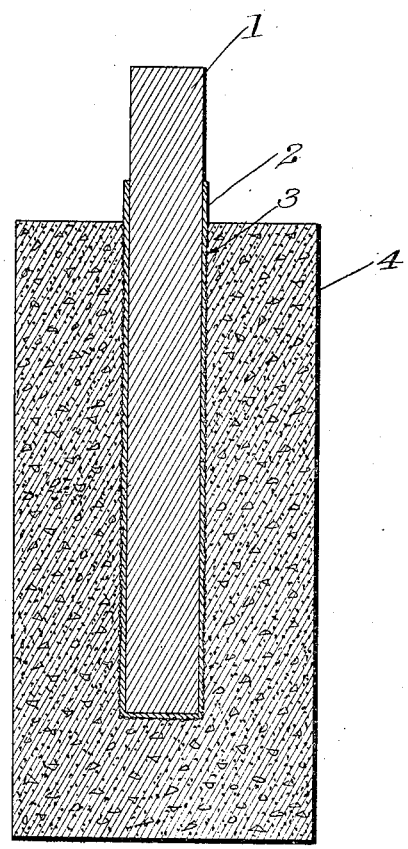
Witness
G. T. Baker.
Inventor
Henry A. Gardner
By Byrnes Townsend Buckenstein
Attorneys

UNITED STATES PATENT OFFICE.

HENRY A. GARDNER, OF WASHINGTON, DISTRICT OF COLUMBIA.

CEMENT STRUCTURE.

1,230,475.   Specification of Letters Patent.   Patented June 19, 1917.

Application filed January 26, 1915. Serial No. 4,538.

*To all whom it may concern:*

Be it known that I, HENRY A. GARDNER, a citizen of the United States, residing at Washington, in the District of Columbia, have invented certain new and useful Improvements in Cement Structures, of which the following is a specification.

This invention relates to cement or concrete structures having iron or steel members embedded therein, the object of the invention being the provision of a structure of this kind wherein the embedded member is not only adequately protected against corrosion arising from electrolytic or other causes, but is also very firmly united or bonded to the concrete.

It is well known that iron or steel reinforcing members, or structural elements, embedded in concrete, are subject to oxidation or solution, particularly under the action of electrolysis; and efforts are made to prevent this corrosion by the application to the metal of various paints or varnishes. It has been naturally assumed that the most suitable coating materials for this purpose would be such as have a high insulating- and water-proofing-value, such for example as the oil varnishes. I have found, however, that although such coatings are partially successful in protecting the metal from corrosion, they present the serious defect of very materially weakening the bond between the cement and the metal, due to the fact that they present a more or less smooth and glossy surface to which the cement does not adhere well. For example, I have found by actual test that a paint, varnish or lacquer, applied to the metal and carefully dried before embedding in concrete, may reduce the bonding strength to fifty per cent., or even to 25 per cent., of its value as compared with the bare metal.

I have found that an exception to this general rule exists in the case of tung oil (China wood oil), and that this oil, when properly prepared or processed, applied to the metal and hardened or permitted to harden thereon by polymerization, does not materially weaken the bond with the cement, as compared with the bonding strength of the bare iron. In fact, in some cases, a material increase in the strength of the bond has been observed. This striking effect appears to be essentially a surface phenomenon. Furthermore, the tung oil is particularly efficacious as an electrical insulator for the above use. It is known that oxidized oils, such as boiled linseed oil and the like, are capable of serving as depolarizers for hydrogen, with the result that when they are subjected in contact with the metal to the cathodic effect of stray currents, they undergo reduction and give rise to more or less fluid products, which are ineffective as insulating films. In the case of tung oil, however, the hardening of the film is largely the result of polymerization, as distinguished from oxidation; and the hardened film does not absorb hydrogen and is not affected by hydrogen to any material degree. Hence the tung oil serves as a highly efficient insulator in cases where electrolytic corrosion is to be guarded against.

I have obtained the best results with tung oil which has been subjected to a so-called processing step, in which it is partially polymerized by moderate heating in presence of a small percentage of the usual driers, such as lead resinate, manganese dioxid, etc., and suitably thinned with turpentine. I do not limit myself however to oil processed in any particular manner, or to the use of turpentine in connection therewith. Such processed oils, as is well known, dry rapidly to a smooth glossy film consisting of the polymerized oil.

If desired, both the bonding and insulating effects of the tung oil may be further improved by sanding the film before it has hardened, as described in my copending application, Serial No. 4539, filed on the same date herewith. By this treatment the film is covered with a layer of partially embedded particles or granules of an insulating substance, as for example sharp white sand or the like, the clean exposed portions of which form an excellent binding surface for the cement. Instead of sand, I may use other granular substances, as crushed quartz, emery, carborundum, crushed slag, or the like. The tung oil, however, forms an effective insulating bond without this supplemental treatment.

The tung oil may be applied as a clear varnish, or it may serve as a vehicle for various pigments, among which are preferred such insulating pigments as asbestine, china clay, silica or the like. In connection with these pigments, I may also use basic or chromate pigments capable of imparting a passive condition to the iron surfaces, as for example red lead, zinc chromate, etc.

The term "cement" is used herein to include cementitious materials in general, as Portland and other cements, concrete, plaster, or the like. For example, the invention is advantageously applied in connection with inserts of expanded metal in plaster or stucco or the like.

The accompanying drawing is a conventional illustration of the present article, the figure being a central vertical section in which 1 indicates an iron rod or bar; 2 the film or layer containing polymerized tung oil; 3 sand or other granular substance partially embedded in said film, and 4 the cement structure in which the coated metal member is embedded.

I claim:—

1. As a new article of manufacture, a cement structure having a metal member embedded therein, and an insulating layer between the metal and the cement, said layer containing polymerized tung oil.

2. As a new article of manufacture, a cement structure having a metal member embedded therein, and an insulating layer between the metal and the cement, said layer comprising a film of polymerized tung oil, and a granular substance the particles of which are partially embedded in said film.

In testimony whereof I affix my signature in presence of two witnesses.

HENRY A. GARDNER.

Witnesses:
 JAS. H. BLACKWOOD,
 N. P. LEONARD.

Copies of this patent may be obtained for five cents each, by addressing the "Commissioner of Patents, Washington, D. C."